United States Patent [19]
Ni

[11] Patent Number: 5,701,648
[45] Date of Patent: Dec. 30, 1997

[54] MULTI-FUNCTIONAL FABRICATING SYSTEM FOR WELDING ELECTRODES

[76] Inventor: Chong Yang Ni, 75 Springbrook Drive, Richmond Hill, Ontario, Canada, L4B 3R3

[21] Appl. No.: 623,319

[22] Filed: Mar. 26, 1996

[51] Int. Cl.$^6$ .................................................. H01R 43/00
[52] U.S. Cl. ..................... 29/33 R; 118/420; 219/145.22
[58] Field of Search .............................. 29/33 R, 33 Q, 29/33 S, 33 P, 564.8, 33 C, 33 E; 174/102 P; 118/407, 419, 420; 219/145.23, 145.22; 425/174.2, 200

[56] References Cited

U.S. PATENT DOCUMENTS

| | | | |
|---|---|---|---|
| 3,619,429 | 11/1971 | Torigai et al. | 264/23 |
| 4,587,726 | 5/1986 | Holmgren | 219/145.22 X |
| 5,432,997 | 7/1995 | Ni | 29/825 |

*Primary Examiner*—William R. Briggs
*Attorney, Agent, or Firm*—David W. Wong

[57] ABSTRACT

This fabricating system provides flux material coating in a continuous manner for a continuous welding electrode as well as for welding electrodes of various selected lengths. The system consists of a driving mechanism for supplying a continuous metal core to a pressure coating station. A straightening device is located between the initial driving mechanism and the coating station to ensure the metal core is in a perfectly straight form when entering the coating station. Multiple pressurized flux coating material bins are coupled to the coating station. The bins are automatically controlled such that when one bin has been depleted, a second bin will be coupled to the coating station immediately to continue the supply of coating flux material continuously to the coating station while the depleted bin is being replenished and pressurized for operation when the second bin becomes depleted. A cutting station is provided which may be operative to sever the metal core into selected lengths prior to being delivered to the coating station.

13 Claims, 1 Drawing Sheet

MULTI-FUNCTIONAL FABRICATING SYSTEM FOR WELDING ELECTRODES

BACKGROUND OF THE INVENTION

This invention relates to a system for continuously fabricating welding electrodes in a relatively high speed in which the flux coating has a high quality.

In the production of welding electrodes having a welding flux material coated on the outside surface of a metal core, the welding flux material coating is commonly applied onto the metal core and then the coated metal core is cut into various selected lengths to form the welding electrodes or rods. Due to the brittleness of the welding flux coating usually a portion of the coating at and around the cut location would separate and disjoin from the metal core resulting in wastage of the welding flux material. Furthermore, the portion of the welding electrode without the flux coating can not be used for welding operation. Such unsatisfactory welding electrode is difficult to correct by the welder during use in the welding operation such as by removing the uncoated portion by cutting it from the electrode in the field. Such field corrective attempt is frustrating to the welder since further portions of the flux coating may easily crack and separate from the metal core in the such field cutting operation.

In order to alleviate the above drawback, attempts have been made by pre-cutting the metal core into the desired lengths prior to being coated. However, the cut metal core rods are difficult to handle, and care must be exercised to ascertain that the metal core is perfectly straight when it is being coated in the coating station otherwise the welding electrode thus formed is also not straight and is therefore not suitable for welding operation.

Moreover, the coating system used for coating a continuous metal core is not suitable for coating pre-cut metal core lengths since the feeding mechanism and alignment mechanism are different in the two operations and they run in different speeds. Furthermore, often the pre-cut metal core lengths must be manually fed slowly into the coating station. The manual operation not only significantly decreases the speed of the production but, in fact, introduces a discontinuation in the production process, since normally there is a time lapse between one rod to the second rod; and a physical gap exists between one rod to the following rod. The coating flux material in the coating station would fill such gap thus it results in the waste of the coating material in such gap which is not providing any productive purpose. Moreover, the coating material at the gap locations may often causing jamming of the metal core rods in the feeding channel resulting in the process must be terminated to clear the blocking in the feeding canal.

SUMMARY OF THE INVENTION

It is a principal object of the present invention to provide a fabricating system which is suitable for producing in a relatively high speed a continuous welding electrode or separate welding electrode rods of a selected length.

It is another object of the present invention to provide a fabricating system in which the metal core is fed always in a straight condition as well as being held in a secure position for coating.

It is another object of the present invention to provide a fabricating system in which the metal core may be continuously cut into a desired length and each cut sections are fed in a contiguous manner through the coating station.

It is yet another object of the present invention to provide a coating station in which the coating material is continuously supplied to the coating station for continuous coating of the metal core travelling therethrough.

Briefly, the fabricating system of the present invention has a receiving guide member operative for receiving and guiding a curved continuous metal core from a supply reel into the system. The metal core is fed to a straightening station having an elongated restrictive linear channel therein. The metal core after passing through the restrictive linear channel is in a straight condition and is driven forward by driving devices into a cutting station. Cutting blades are provided at the cutting station to sever the metal core into sections having a selected length. A plurality of pairs of gripping fingers are provided at the driving devices as well as at the cutting station for temporarily holding the metal core securely in place while it is being cut as well as for advancing the metal core forward in the system. The cut sections of the metal core are driven forward by the driving device as well as are being pushed by the following sections in a contiguous manner into the coating station one after the another. At least two pressurized flux material supply bins are alternately coupled to the coating station for supplying the coating material continuously to the latter. One supply bin is coupled to the coating station while the depleted bin is shut off from the coating station, de-pressurized and replenished, and subsequently re-pressurized to the stand by condition ready to supplying the flux material to the coating station when the present bin is depleted of flux material.

BRIEF DESCRIPTION OF THE DRAWING

Other objects and advantages of the present invention will become apparent from the following detailed description of the preferred embodiment thereof in connection with the accompanying drawing in which.

DETAILED DESCRIPTION OF THE PREFERRED EMBODIMENT

Figure 1:
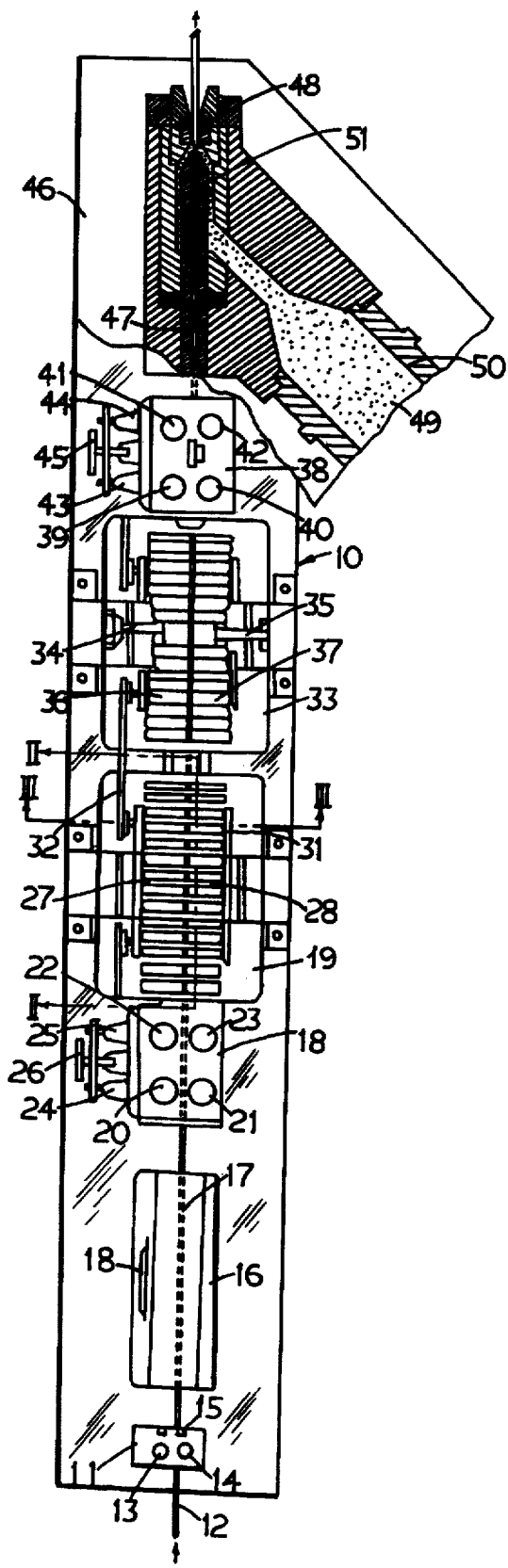
FIG. 1 is a partial perspective over all top elevation view of the system according to the present invention.

With reference to the drawings wherein like reference numerals designate corresponding parts in the various views therein, the fabricating system 10 of the present invention has a receiving guide 11 through which the bare metal core 12 is inserted. The receiving guide 11 may comprise of two free turning rollers 13 and 14 having an adjustable space apart from each other to receive the continuous metal core 12 of a selected diameter from inserted therebetween. Alternatively, one or both of the rollers 13 and 14 may be motor driven to pull the metal core 12 into the system. A guide 15 is located at the outlet of the receiving guide 11 to direct the metal core 12 towards a straightening station 16 which has an elongated restrictive linear channel 17 as best shown in dotted lines in FIG. 1. The width of the channel 17 may be adjusted by operating an adjusting device 18 shown schematically. Initially, the metal core 12 is supplied to the system from a supply reel such that it is curved condition. After passing through the straightening station 16, the curvature of the metal core 12 is eliminated by the restrictive linear channel 17 such that the metal core is in a straight condition. The metal core 12 now in a straight condition is driven by a first sending device 18 into an advance station 19. The first sending device 18 includes two pairs of drive rollers comprising rollers 20, 21 and 22, 23. The drive rollers 20 and 21 are driven by a motor 24 while the rollers 22 and 23 are driven by a motor 25. The space between the drive rollers may be adjusted by operating a mechanical adjusting means 26 so as to accommodate metal cores of various diameters. The speed of the motors 24 and 25 may also be electrically controlled to ensure that the metal core 12 is driven in a selected speed and force to the advance station 19.

Figure 2:
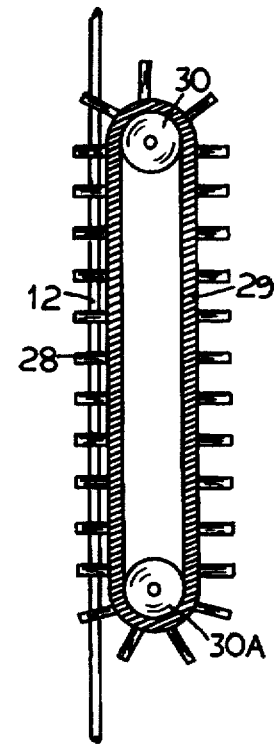
FIG. 2 is an enlarged isolated side elevation view along section line II—II of FIG. 1 showing the advance station with the plurality of gripping fingers mounted on the continuous drive belt therein.
Figure 3:
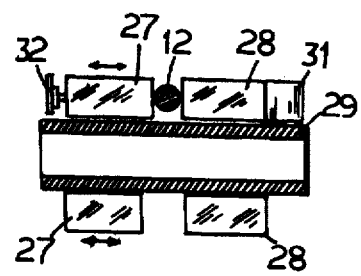
FIG. 3 is an enlarged isolated cross section view along section line III—III of FIG. 1.

As best shown in FIGS. 2 and 3, at the advance station 19 a plurality of pairs of gripping fingers 27 and 28 are mounted on a continuous drive belt or chain 29 which is continuously rotatable between a drive wheel 30 and a free turning wheel 30A. The gripping fingers 27 and 28 are slidable sideways or alternatively only the gripping fingers 27 are slidable relative to the drive belt or chain 29, while the gripping fingers 28 are fixedly mounted on the drive belt or chain 29. The gripping fingers 28 are in slidable contact with an abutment bar 31 while the gripping fingers 27 travelling in the path of the metal core 12 are pushed by a spring loaded bar 32 to slide sideways against the metal core 12 such that the gripping fingers 27 and 28 cooperate with one another to grasp the metal core 12 for advancing it forwards to be advanced thereby to a cutting station 33 in the system. The use of gripping fingers 27 and 28 to advance the metal core prevent the metal core from being compressed and deformed by the advancing means. At the cutting station 33 a plurality of pairs of cutting blades 34 and 35 are mounted on another continuous drive belt Similar to that in the advance station 19 and are located at selected intervals such that as the cutting blades 34 and 35 engage with the metal core 12 to sever it into metal core sections having a selected length. A plurality of closely spaced pairs of additional gripping fingers 36 and 37 are also mounted on the drive belt or chain therein similar to that in the advance station 19. As the drive belt therein rotates these additional closely spaced gripping fingers 36 and 37 not only assist in advancing the metal core in the system, they also provide the holding means for securely holding the metal core 12 while it is being severed by the cutting blades 34 and 35.

The cut section of the metal core 12 is pushed by the uncut portion to a second sending device 38 which may have a similar construction as the first sending device 18 and comprises two pairs of drive rollers 39, 40 and 41, 42. The drive rollers 39 and 40 are driven by a motor 43, and drive rollers 41 and 42 are driven by a motor 44. The spaces between the drive rollers 39, 40 and 41, 42 may be adjusted also by operating an mechanical adjusting device 45 to accommodate metal cores of various diameters.

The cut section of the metal core 12 is driven by the second sending device 38 as well as being pushed by the next cut section into the coating device 46. Thus, the cut sections of metal core are being fed in a contiguous manner into the coating device 46 so that adjacent cut sections are abutting each other with negligible space gaps between the adjacent cut sections. It can be appreciated that in coating a continuous welding electrode the cutting blades 34 and 35 at the cutting station 33 are not operated such that the metal core 12 is not severed into separate sections.

The coating station 46 has a structure similar to that described in applicant's copending U.S. patent application Ser. No. 08/623,111, which has an elongated guide member 47 directing the metal core to a coating mould 48. The guide member 47 also securely holds the metal core 12 in place while it is being coated. The coating flux material 49 is provided by a selected one of at least two pressurized supply bins 50 coupled to the coating station 46 and is fed to the coating mould 48 through an annular channel 51 within the body of the coating station 46. The annular channel 51 surrounds the upper portion of the guide member 47. The two supply bins 50 are alternately coupled to the coating station 46, when the coating flux material in one bin is depleted such that flux material may be continuously fed to the mould 48 while the depleted supply bin is being de-pressurized and replenished and followed by re-pressurization and is ready for supplying the flux material to the mould as soon as the bin in operation becomes depleted of the flux material.

In the above manner, continuous welding electrodes or welding rods of various diameter sizes and of a high quality may be fabricated in a relatively high speed and at a high efficiency with the system of the present invention.

While presently preferred embodiments of the invention have been illustrated and described above, it will be recognized that the invention may be otherwise variously embodied and practiced within the scope of the claims which follow.

I claimed:

1. A welding electrode fabricating system for continuously coating a flux material on a metal core of a welding electrode comprising in combination, a receiving guide member operative for receiving and guiding a continuous metal core into said system, a straightening station having an elongated restrictive linear channel therein operative to receive said metal core from said receiving guide member to pass therethrough, a sending device located adjacent to said straightening station and being operative for driving said metal core forward in said coating system, said sending device including two pairs of driving rollers operative to grip and drive said metal core forward, a coating station coupled to said sending device, said coating station having at least two pressurized flux material supply bins alternately coupled to said coating station whereby when first bin is depleted of the flux material, the second bin is coupled to said coating station while said first bin is being de-pressurized and replenished and followed by re-pressurization to ready for supplying the flux material to said coating station when the second bin is depleted of the flux material.

2. A welding electrode fabricating system according to claim 1 including an advancing station operative to receive said metal core from said sending device, said advancing station including a plurality of pairs of gripping fingers mounted on a rotatable continuous drive chain, said gripping fingers being engageable with said metal core at said advancing station for gripping said metal core and advancing said metal core thereby.

3. A welding electrode fabricating system according to claim 2 including a cutting station coupled to said advancing station, a plurality of pairs of cutting blade members disposed at selected intervals on another rotatable continuous drive chain located at said cutting station, said pairs of blades being engageable with said metal core passing through said cutting station for severing said metal core into sections having a selected length.

4. A welding electrode fabricating system according to claim 3 including a second sending device located between said cutting station and said coating station and being operative for driving said cut sections of metal core from said cutting station to said coating station.

5. A welding electrode fabricating system according to claim 4 wherein said second sending device includes two pairs of motor driven rollers, adjusting means coupled to said rollers and being operative to vary the spacing between the rollers in both pairs of said motor driven rollers.

6. A welding electrode fabricating system for continuously pressure coating a flux material on a metal core to form welding rods, comprising

- a receiving guide member operative for receiving and guiding said metal core supplied thereto from a supply reel,
- a straightening station coupled to said receiving guide member, said straightening station having an elongated restrictive linear channel therein operative to receive said metal core from said receiving guide member to pass therethrough,
- a linear advancing station including a plurality of pairs of gripping fingers slidably mounted on a rotatable continuous drive chain located at said advancing station, said rotatable drive chain being rotatable whereby said gripping fingers are serially engageable with said metal core at said advancing station for gripping said metal core therein and to advance said metal core forward in said system,
- a cutting station coupled to said advancing station and being operative to receive said metal core from straightening station, a plurality of pairs of cutting blade members being mounted at a selected interval on a second rotatable continuous drive chain provided at said cutting station, said second rotatable continuous drive chain being operative for operating said pairs of cutting blade members to engage with said metal core thereby severing said metal core into sections having a selected length,
- a driving member coupled to said cutting station and being operative to receive said metal core sections from said cutting station, at least one pair of motor driven rollers disposed at said driving member and being operative to drive said metal core sections in a contiguous manner forward in said fabricating system,
- a coating station coupled to said driving member and being operative to receive said metal core sections from said driving member, a coating mould located in said coating station,
- an elongated tubular guide member located in said coating station and being operative to receive said metal core sections from said driving member and to guide said metal core sections to said coating mould,
- a pressurized flux material supply bin member coupled to said coating station and being operative to supply the flux coating material to said mould for coating said metal core sections passing therethrough.

7. A welding electrode fabricating system according to claim 6 including a first driving member located between said straightening station and said advancing station, at least one pair of motor driven rollers located at said first driving member and being operative to drive said metal core from said straightening station to said advancing station.

8. A welding electrode fabricating system according to claim 7 adjusting means located at said first driving member and said driving member and being operative to vary the spacing between said rollers for driving metal cores of various sizes.

9. A welding electrode fabricating system according to claim 8 wherein said flux material supply bin member includes at least two pressurized bins alternately coupled to said coating station for supplying said coating material continuously to said coating mould.

10. A welding electrode fabricating system according to claim 9 wherein only one of said supply bin is coupled to said coating station and when said one of said supply bins is shut off from said coating station when the coating material is depleted therefrom while the other one of said supply bins is coupled to said coating station to supply the coating material continuously to said coating mould, said one of said supply bins after shut off from said when the other one of said supply bin is depleted of flux coating material.

11. A welding electrode fabricating system according to claim 10 including a second adjusting means in said straightening station, said second adjusting means being operative to vary the diameter of said restrictive linear channel therein to accommodate metal cores of various sizes.

12. A welding electrode fabricating system according to claim 11 wherein the gripping fingers located on one side of said metal core are slidably sideways relative to said continuous drive chain, and being engageable with a spring loaded bar located adjacent the path of said metal core whereby said spring loaded bar pushes said gripping fingers against said metal core to grip said metal core for advancing said metal core forward as said continuous drive chain rotates.

13. A welding electrode fabricating system according to claim 12 wherein said continuous drive chain in said advance station is mounted between a drive wheel and a free turning wheel.

\* \* \* \* \*